Feb. 26, 1952        R. C. NELSON        2,587,370
METAL CUTTING TOOLHOLDER
Filed July 16, 1948        2 SHEETS—SHEET 1
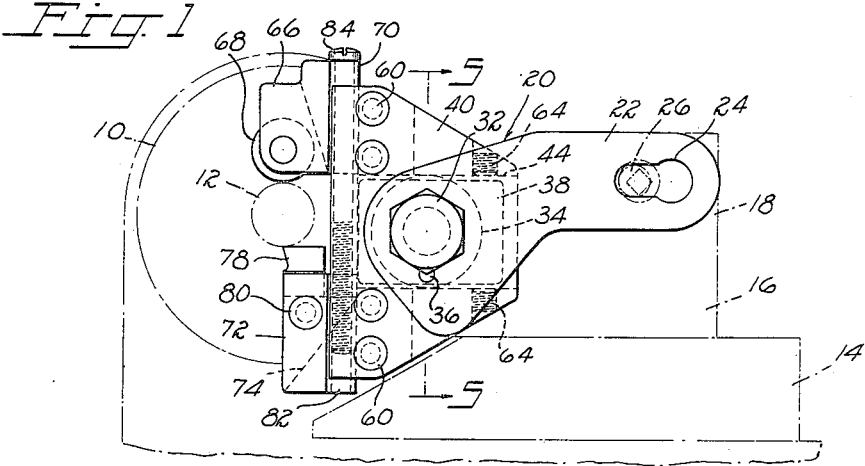
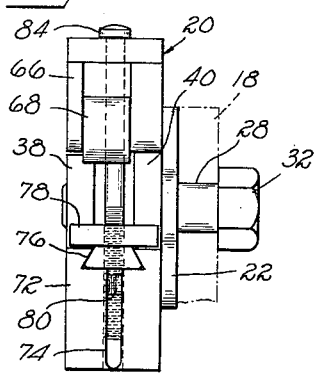
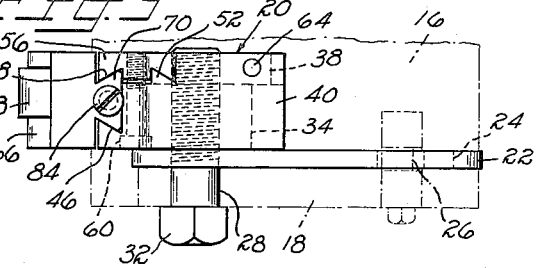
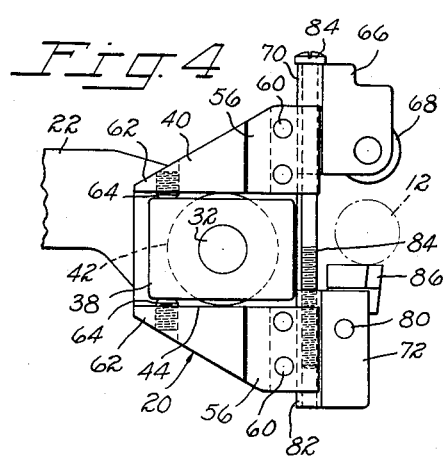
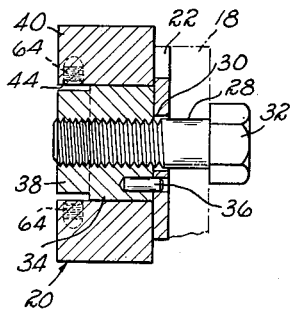
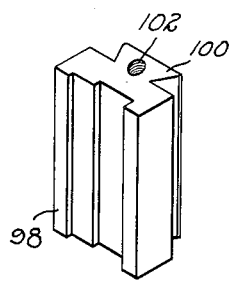
Inventor
ROBERT C. NELSON
By Lindsey, Prutzman + Just
Attorneys Feb. 26, 1952   R. C. NELSON   2,587,370
METAL CUTTING TOOLHOLDER
Filed July 16, 1948   2 SHEETS—SHEET 2
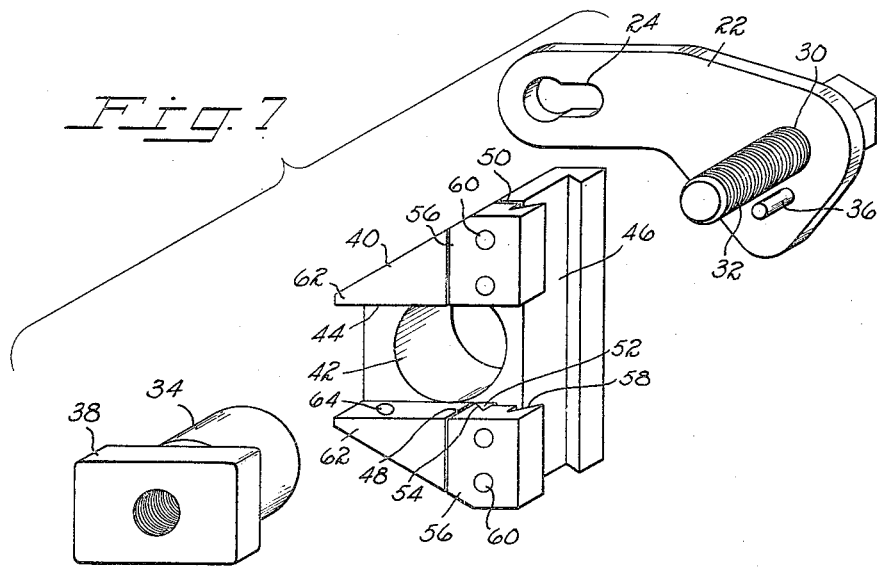
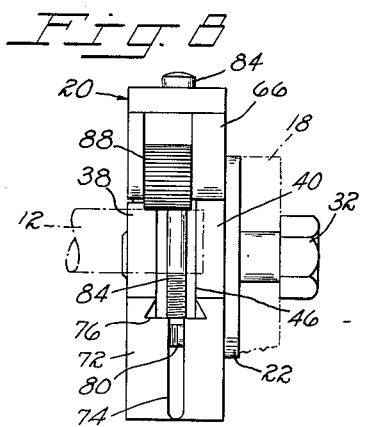 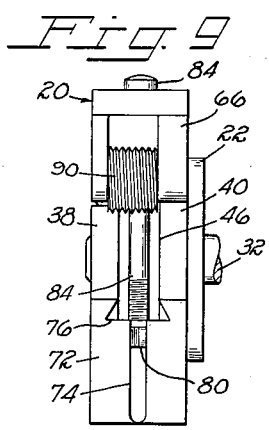 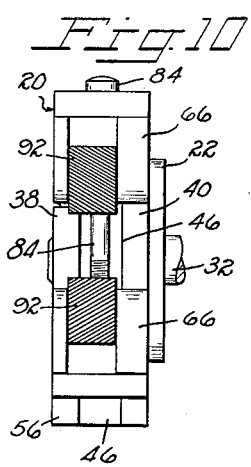
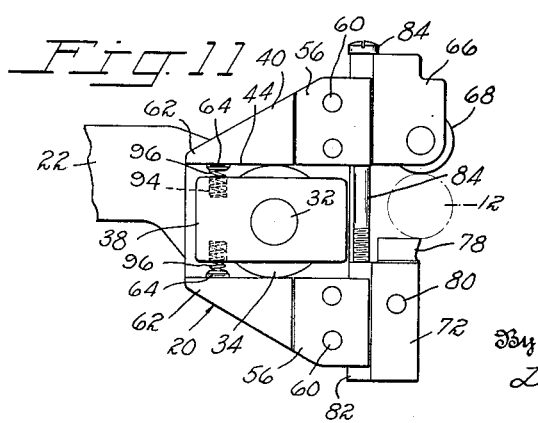
Inventor
ROBERT C. NELSON
By Lindsey, Prutzman + Just
Attorneys Patented Feb. 26, 1952

2,587,370

UNITED STATES PATENT OFFICE 2,587,370

METAL CUTTING TOOLHOLDER

Robert C. Nelson, Kensington, Conn., assignor, by mesne assignments, to John J. Milo, Elizabeth, N. J., doing business as Jersey Manufacturing Co.

Application July 16, 1948, Serial No. 39,019

2 Claims. (Cl. 82—35)

This invention relates to a metal working and cutting tool holder suitable for use with, but without limitation thereto, machine tools such as screw machines, certain types of automatic lathes, and the like.

It is an object of this invention to provide a metal cutting tool holder for use with automatic screw machines and the like to render them capable of wider and more universal uses than has heretofore been possible.

It is another object of the invention to provide a tool holder having means to accommodate a relatively wide range of tools so as to render screw machines and the like capable of performing operations such as shaving, skiving, form cutting, thread rolling, various types of knurling, and other operations which will be apparent from the description given hereinafter.

It is a further object of the invention to provide a tool holder having a support suitable for attachment to a member of a screw machine or the like, and a tool holding head connected to said support in such a manner that it may be selectively either fixed relative to said support or mounted so as to have limited oscillation relative thereto to permit the tools carried by the head to seek their own operating level while performing certain metal working or cutting functions. As a part of this object, the construction of the holder is such that it may be changed from accommodating tools for performing one function to accommodating tools for another function by simple means requiring few adjustments.

Still another object of the invention is to embody within the tool holder adjustment means capable of holding all of the afore-mentioned tools with precision as well as permitting them to be precisely adjusted.

A still further object of the invention is to provide within the tool holder means to effect relative adjustment between two tools carried by the head of the holder, said means cooperating with clamping mechanism embodied within the head in order to effect precise adjustment between the tools and said head.

It is still another object of the invention to so construct a tool holder that it is compact, rugged, small in over-all size, and of relatively simple design.

Details of these objects and of the invention as well as other objects thereof are set forth in the following specification and illustrated in the attached drawings forming a part thereof.

In the drawings:

Fig. 1 is a side elevation of a tool holder embodying the principles of the present invention, said holder being shown attached to an automatic screw machine, the illustrated parts of the latter being shown in dot and dash lines.

Fig. 2 is a front elevation of a tool holder shown in Fig. 1.

Fig. 3 is a top plan view of the tool holder shown in Fig. 1.

Fig. 4 is a side elevation of the tool holder shown in Fig. 1 as viewed from the side opposite that illustrated in Fig. 1.

Fig. 5 is a sectional elevation of a detail of the invention taken on the line 5—5 of Fig. 1.

Fig. 6 is a perspective view of a form cutting tool constructed for use with the tool holder shown in the various figures.

Fig. 7 is an extended perspective view of the basic elements of the tool holder shown in the foregoing figures.

Figs. 8, 9, and 10 are front elevational views similar to Fig. 2 but respectively illustrating the tool holder accommodating a straight knurling tool, a thread rolling tool, and a pair of diagonal knurling tools.

Fig. 11 is a side elevation similar to Fig. 4 but illustrating another embodiment of the invention.

For purposes of illustrating the present invention advantageously, an automatic screw machine has been selected to illustrate the tool holder used in conjunction therewith, but it is to be understood that said tool holder may be used with other machines such as certain types of automatic lathes and the like.

The tool holder comprising the present invention has been designed to render it capable of accommodating a relatively wide range of tools which may be held thereby either directly or in sub-tool holders, whereby the tool holder permits a machine such as a screw machine, with which it is used, capable of a wider range of metal cutting or working functions than has heretofore been possible. Such relatively wide range of functions is possible notwithstanding the fact that the over-all size of the tool holder is relatively small. Further, it is composed of only a small number of cooperating parts which are ruggedly and compactly designed in order to enable the holder to perform the afore-mentioned range of functions.

Referring to the drawings, and particularly Fig. 1, the spindle head 10 of a conventional screw machine, such as a "Brown and Sharpe," is shown. A work piece of stock material 12 is held in said head. There is also illustrated a tool-carrying member 14 comprising a conventional cross slide head having a standard tool support 16 fixed thereto. Inasmuch as none of these above-described parts of a conventional screw machine comprise an essential part of the present invention, the same are illustrated in dot and dash lines.

The tool support 16 has a portion 18 which directly supports the tool holder 20 comprising the present invention. Said tool holder comprises a plate-like support 22 which abuts portion 18 of the tool support 16. Said portion 18 may be slotted if desired to receive support 22. One end of the support 22 is provided with an aperture 24 which receives a cam 26 rotatably supported by portion 18 of the tool support 16. Portion 18 is also provided with an aperture 28 which is aligned with an aperture 30 formed within support 22 when said support is mounted in operative position relative to the portion 18. A bolt 32 passes through said apertures and cooperates with cam 26 to adjustably support the support 22 relative to portion 18 of the tool support 16. Support 22 may be pivotally adjusted a limited amount about the axis of bolt 32 by movement of cam 26. A hollow bushing comprising a pintle 34 is threadably engaged by bolt 32 so as to secure said pintle to support 22. In order that relative rotatable movement between said pintle and support may not take place, a pin 36 is provided which extends into aligned openings within pintle 34 and support 22 as is clearly shown in the drawings. The outermost end of pintle 34 is provided with a squared or rectangular abutment member 38 for purposes to be described.

A head member 40 having a bearing aperture 42 is pivotally mounted on pintle 34. One side face of said head is provided with a transverse groove 44 which receives and is slightly wider than the abutment member 38 on pintle 34. In view of the space between the sides of groove 44 and the opposed side surfaces of abutment member 38, a limited amount of oscillating movement is possible between head 40 and the support 22 to which pintle 34 and abutment member 38 are secured in unitary relationship. It will be noted that the opposite ends of abutment member 38 project laterally beyond the aperture 42 in head 40 and such projecting ends serve to prevent removal of head 40 from the support 22 except when desired.

Head 40 is provided with a guide groove or channel 46 comprising aligning means which extend vertically from the top to the bottom surfaces of said head. In cross section, as viewed particularly in Fig. 3, said channel comprises half of a dove-tailed configuration. The same side surface of head 40 which contains groove 44 is provided with a pair of vertically aligned recesses 48 and 50. In transverse cross section, as viewed in Figs. 1 and 7 particularly, these recesses have an irregular configuration mainly defined by walls meeting at a right angle but one surface or wall having a sharp angled rib 52 projecting therefrom for purposes of engaging a groove 54 having a complementary configuration formed in the inner surface of clamping means 56.

There is a pair of vertically aligned clamping means 56, as shown in Figs. 1, 4, and 7 particularly. Each clamping means is formed with a second groove 58 but with the angular wall thereof extending in opposite direction to the angular wall of groove 54. This arrangement of grooves is shown to best advantage in Figs. 3 and 7, and it will be seen that the clamping means 56 may be rotated end for end about their horizontal axis so that either groove 54 or 58 will engage rib 52 to hold the clamping means aligned relative to the head 40. The other groove not engaging rib 52 will be opposed to the side wall of guide channel 46 and cooperate therewith to provide a guide channel which is dove-tailed in cross section. In view of the provision of two spaced but vertically aligned clamping means 56, there is a pair of vertically aligned dove-tailed guide channels at opposite ends of the head 40. Clamping means 56 are preferably removably secured to head 40 by a pair of suitable screws 60 which are threaded into the head 40. These screws may be the so-called socket type screws as shown, if desired, and the heads thereof may be recessed into head 40 while the other ends are threaded into clamping means 56.

The provision of transverse groove 44 within the head 40 provides a pair of opposed portions 62 on the head which are engageable with the opposed side surfaces of abutment member 38 as described above. Such engagement will limit the oscillating movement of the head relative to the support 22 as described, but such oscillating movement may be either further limited or prevented entirely by the provision of a pair of opposed set screws 64 in said opposed portions 62. The function of these set screws will be apparent from Figs. 1 and 4 particularly. In Fig. 4, the set screws are shown in firm engagement with the opposed side surfaces of abutment member 38, whereby no oscillating movement will be possible between the head 40 and support 22. The use of this arrangement will be described hereinafter. It will thus be seen that set screws 64 comprise selectively operable means to hold head 40 rigid relative to support 22 when desired.

The head 40 is capable of accommodating one or more of a plurality of different kinds of metal working or cutting tools. For example, in Figs. 1, 2, and 11, there is illustrated an arrangement of tools with which metal shaving may be performed. In these figures, a tool holder 66 which is actually in the nature of a sub-tool holder rotatably supports a backing roller 68. For purposes of this description and the appended claims, roller 68 is considered a tool. Said tool holder 66 is provided with a rear extension 70 which is dove-tailed in cross section and is complementary to the guide channel 46. When clamping means 56 is clamped against the extension 70, tool holder 66 will be firmly and precisely held fixed in any desired relationship relative to head 40.

There is also provided another tool holder 72 which, as with tool holder 66, is in the nature of a sub-tool holder, the same preferably being provided with a vertical groove 74, shown in Figs. 1 and 2. The inner wall of said groove extends at an angle as shown in Fig. 1. The upper surface of tool holder 72 is provided with a transverse channel 76 which is dove-tailed in vertical elevation for purposes of receiving a shaving tool 78 having a dove-tailed extension clearly shown in Fig. 2. Due to the provision of groove 74, the opposite side portions of holder 72 may be flexed and the opposed walls of channel 76 may be moved toward each other by screw 80 to securely and precisely clamp the shaving tool 78 within said channel. The tool holder 72 is also provided with a rear extension 82 which is dove-tailed in cross section for reception within guide channel 46. The lower clamping means 56 will securely hold tool holder 72 in any desired adjusted position relative to head 40 when the screws 60 thereof are tightened.

Tool holders 66 and 72 are provided with vertically aligned apertures within the extensions 70 and 82 thereof as shown in Figs. 1 and 4. The aperture in either the lower tool holder or both of them is threaded for purposes of receiving an elongated bolt 84 which is threaded at its lower end as viewed in Figs. 1 and 4. Said bolt may revolve freely relative to the upper tool holder held within the head 40 so that relative adjustment may be readily made between a pair of tool holders and the head 40.

Assuming it is desired to adjust the backing roller 68 relative to the shaving tool 78 for purposes of performing a shaving operation on work stock 12, either the tool holder 66 or 72 is clamped within the guide channel 46 at any arbitrary position in which the roller 68 or tool 78 is spaced from the stock 12. The other tool holder is then freed for movement within guide channel 46 and bolt 84 is rotated to move the last-mentioned tool holder so as to dispose the tool carried thereby in adjusted position relative to the stock 12. Said last-mentioned tool holder is then clamped relative to head 40. The other tool holder is then loosened for movement relative to the guide channel 46 and bolt 84 is again rotated to move said tool holder and its tool into precise adjustment relative to the tool of the first-mentioned tool holder as well as relative to the work stock 12. Said second tool holder is then clamped firmly relative to the head 40. The two tools are then in operative position relative to each other and head 40.

For shaving operations, it is preferred that oscillating movement be permitted between head 40 and abutment member 38 in order that the roller 68 and tool 78 may to a limited extent seek their own positions relative to stock 12. In Fig. 4, however, tool holder 72 is shown holding a skiving tool 86. When using such tool, no backing means such as roller 68 is necessary and thus said roller and its holder 66 is moved to inoperative position as viewed in Fig. 4. However, said holder 66 may be clamped relative to head 40 in order that bolt 84 may be rotated to move holder 72 and skiving tool 86 into precise operative position. When skiving, no oscillating movement should be possible between head 40 and support 22. Thus, as viewed in Fig. 4, set screws 64 are shown in tight engagement with the opposed side surfaces of an abutment member 38 in order that no movement will be possible between head 40 and support 22.

As mentioned hereinabove, the tool holder comprising the present invention is adapted for a number of other kinds of metal working and cutting operations. For example, in Fig. 8, a tool holder 66 rotatably supports a knurling tool 88 designed for straight knurling. When performing a knurling operation, there is also preferably no oscillatory movement permitted between the head 40 and support 22.

Similarly, in Fig. 9, there is illustrated a threaded rolling tool 90 rotatably supported by tool holder 66, and when said tool is being used, there should be no movement between head 40 and support 22. When using the threaded rolling tool 90 and straight knurling tool 88, no tool is operatively used in the lower portion of the guide channel 46 if the rolling and knurling tools are held in the upper portion of the guide channel.

The tool holder comprising the present invention is also suitable for performing diamond-type knurling and, to this end, there is illustrated in Fig. 10 a pair of tool holders 66 which are the type that rotatably support tools such as the pair of diagonal knurling tools 92. When operating the tools shown in Fig. 10, there may or may not be oscillatory movement possible between the head 40 and support 22, as desired. From the foregoing, it will also be seen that by using means such as sub-tool holders 66 and 72, for example, the various tools 68, 78, 86, 88, 90, and 92 are interconnected to the head 40.

As mentioned hereinabove, when the shaving tool and roller combination 78 and 68 are being used as illustrated in Fig. 1, oscillating movement is generally permitted between the head 40 and the support 22. Under some circumstances, however, it may be desired to not have such oscillating movement entirely free, and, to this end, the embodiment of the invention illustrated in Fig. 11 may be utilized in which resilient means are interposed between head 40 and abutment member 38. In one specific example of this embodiment, abutment 38 is provided in its opposed side faces with a pair of substantially aligned apertures 94 for purposes of receiving resilient means comprising helical springs 96. The outer ends of these springs are directly engaged by set screws 64. This arrangement thus permits a limited amount of additional pivotal movement between the head 40 and support 22 notwithstanding the fact that the set screws 64 and springs 96 are normally in contact with each other. The tension under which these springs are placed will depend upon the extent set screws 64 are moved toward abutment member 38. Also, for example, alternative resilient means such as leaf springs or rubber inserts may be used in lieu of springs 96.

Inasmuch as the springs 96 will render the head 40 self-centering but capable of limited pivotal movement, it is conceivable that the embodiment shown in Fig. 11 will be useful while performing operations other than shaving.

As mentioned above, the tool holder comprising the present invention is suitable for form cutting operations and an exemplary form cutter 98 to be used during such operations is illustrated in Fig. 6. Said cutter is provided with an extension 100 having a dove-tailed cross sectional configuration so that it may be accommodated in either the lower or upper portion of guide channel 46. It will be noted that cutter 98 is provided with a threaded, longitudinally-extending aperture 102 to be engaged by bolt 84, whereby the cutter may be adjusted relative to the work in the manner described above concerning the other cutting tools referred to.

In the preferred use of a form cutting tool of this nature, the cutting edge operates on the center of the work stock and in order that such tool may be securely held by the head 40, the tool 98 is made somewhat longer than the tool holders 72 referred to hereinabove since the tool 98 is directly held within the guide channel 46 without requiring the use of any additional means such as holder 72. When using form cutting tool 98, the head 40 will be held rigidly relative to support 22 and, generally, no other tool is used in conjunction with tool 98. However, in order that adjustment of tool 98 may be effected in the above-described manner, it is preferred that a tool holder 66, for example, be mounted in the opposite end of the guide channel 46 in order that bolt 84 may cooperate therewith to effect adjustment of cutter 98 relative to the work such as stock 12.

While the invention has been illustrated and described in its preferred embodiments and has included certain details, it should be understood that the invention is not to be limited to the precise details herein illustrated and described since the same may be carried out in other ways, falling within the scope of the invention as claimed.

I claim as my invention:

1. A self-centering tool assembly for use on metal working machines, said assembly comprising an apertured support arm detachably secured to the machine, a tool head disposed in side by side relation with said support arm on the outer side thereof and with its front face extending toward the longitudinal axis of the machine, means on said head defining a transverse bearing aperture in registry with the support arm aperture, and means on said head defining a laterally extending channel in the outer side thereof across the open end of said bearing aperture, a stub shaft having a threaded bore disposed in said bearing aperture for rotation of said tool head relative thereto with one end abutting the outer side of said support arm, an abutment head on the other end of said shaft disposed in said channel in spaced relation to the sides thereof, a bolt disposed in the support arm aperture and threadably engaging said shaft, said support arm and said shaft having registering keyways and a pin disposed in said keyways to prevent relative rotation between said shaft and said support arm, and a tool holder adjustably mounted on the front face of said tool head arranged to support a work-engaging tool in proximity to the outer side of said tool head.

2. A self-centering shaving tool assembly for use on metal working machines, said assembly comprising a support arm detachably secured to the machine, a tool head disposed in side by side relation to said support arm on the outer side thereof and with its front face extending toward the longitudinal axis of the machine, means on said head defining a transverse bearing aperture and a laterally extending channel in the outer side thereof across the open end of said bearing aperture, a stub shaft disposed in said bearing aperture for rotation of said tool head relative thereto and detachably secured to said support arm against rotation relative thereto, an abutment head on the outer end of said shaft disposed in said channel in spaced relation to the sides thereof whereby said tool head is permitted limited oscillatory movement relative to said support arm, means on the front face of said tool head defining an elongated generally vertical guide surface, an upper tool holder slidably engaging said guide surface, means for clamping said upper tool holder to said head in adjusted positions along said guide surface, a lower tool holder slidably engaging said guide surface, second clamping means for clamping said lower tool holder to said head in adjusted positions along said guide surface, means interconnecting said tool holders and arranged to effect adjustment therebetween, a work-engaging tool supported by said upper tool holder and depending therefrom proximate the outer surface of said tool head, said lower tool holder having a guide surface angularly related to the guide surface of the said head, a shaving cutter overlying said lower holder and slidably engaging the guide surface thereon, said shaving cutter having a cutting edge in proximity to the outer side of said tool head, and clamping means connected to said lower holder for clamping said cutter in adjusted positions along the guide surface of said lower holder whereby said cutter may be adjusted relative to the longitudinal axis of said machine to facilitate sharpening of said cutter.

ROBERT C. NELSON.

REFERENCES CITED

The following references are of record in the file of this patent:

UNITED STATES PATENTS

| Number | Name | Date |
|---|---|---|
| 1,375,785 | Drowns | Apr. 26, 1921 |
| 1,751,078 | Drowns | Mar. 18, 1930 |
| 2,412,757 | Smith | Dec. 17, 1946 |
| 2,453,722 | Moss | Nov. 16, 1948 |